United States Patent [19]

Tsukagoshi et al.

[11] 4,172,112
[45] Oct. 23, 1979

[54] METHOD FOR MOLDING A COVER OF SYNTHETIC RESIN POWDER MATERIAL ON A CORE OF IRREGULAR SURFACE CONFIGURATION

[75] Inventors: Eigoro Tsukagoshi, Matsudo, Japan; Yoshio Arai, 1400, Kamihongo, Matsudo-shi Chiba-ken, Japan

[73] Assignee: Yoshio Arai, Matsudo, Japan

[21] Appl. No.: 886,919

[22] Filed: Mar. 10, 1978

[30] Foreign Application Priority Data

Mar. 17, 1977 [JP] Japan ................................. 52-29900

[51] Int. Cl.² .............................................. D04H 1/16
[52] U.S. Cl. .................................... 264/113; 264/120; 264/127; 264/250
[58] Field of Search ............... 264/120, 127, 126, 112, 264/113, 250, 234, 248

[56] References Cited

U.S. PATENT DOCUMENTS

| | | | |
|---|---|---|---|
| 3,011,219 | 12/1961 | Williams | 264/127 |
| 3,223,763 | 12/1965 | Keen | 264/127 |
| 3,537,700 | 11/1970 | Schenck, Jr. et al. | 264/127 |
| 3,873,663 | 3/1975 | Bertolet, Jr. | 264/120 |

*Primary Examiner*—Robert F. White
*Assistant Examiner*—James R. Hall
*Attorney, Agent, or Firm*—Haseltine, Lake & Waters

[57] ABSTRACT

A method for molding a cover on a metal core by preforming cover segments and molding the latter to size with the core interposed therebetween. When molded, the preformed segments are gradually deformed and uniformly compacted to a high density particularly in regions in direct contact with the wall surfaces of the mold, with no inclusion of cracks, pinholes or other structural defects therein. The product molded in this manner exhibits a very high corrosion-resisting characteristic with no machining operation conventionally required thereon, particularly when molded of tetrafluoroethylene resin powder.

4 Claims, 9 Drawing Figures

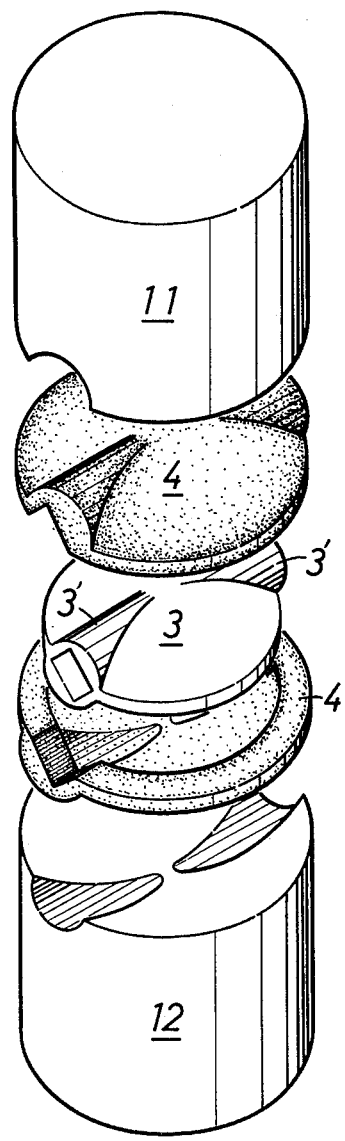
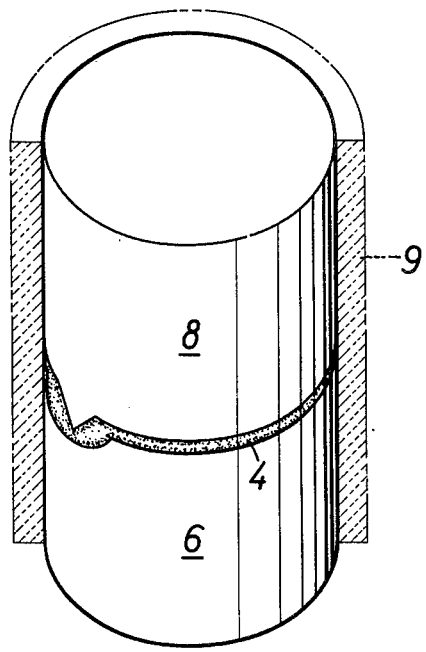
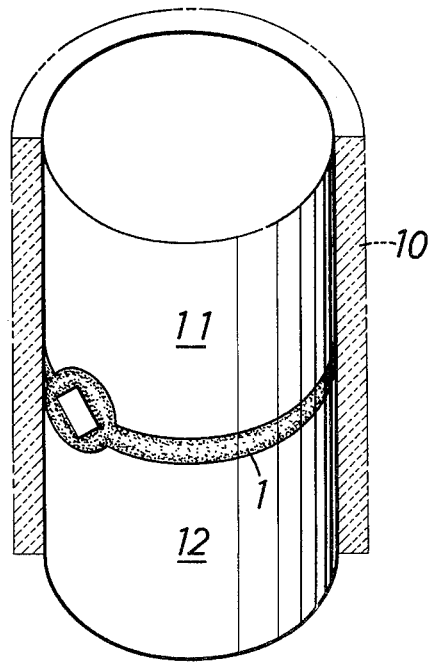
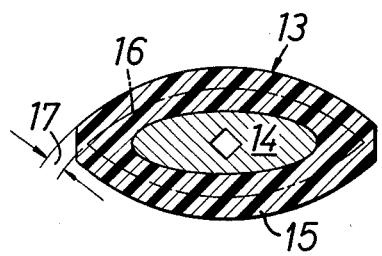

METHOD FOR MOLDING A COVER OF SYNTHETIC RESIN POWDER MATERIAL ON A CORE OF IRREGULAR SURFACE CONFIGURATION

BACKGROUND OF THE INVENTION

This invention relates generally to a method for molding articles of synthetic resin powder material and more particularly to those having covered or encapsulated therein a core of uneven surface configuration including a depression and/or a protrusion or a curved area thereon.

Recently, in chemical and other industries, with the use of increasingly high pressures and temperatures in various fluid-handling systems, there is arising a demand for improvements in pressure- and heat-resisting properties of materials for component parts of such systems. Also, due to increase in the variety of chemicals used and liquids handled, improvements in corrosion resistance of the component parts are keenly needed. One known measure taken to improve the corrosion resistance of components of fluid-handling systems is to cover the surface of the system components, ordinarily made of metal material, with a lining uniformly formed thereon of an appropriate highly corrosion-resistant material. As materials for such lining, tetrafluoroethylene and other synthetic resins are in wide use and, among others, tetrafluoroethylene resin is suitable as a lining material for use in protecting various component units such as liquid control valves. It has been very difficult, however, to apply such lining material to component parts of any complicated exterior configuration such as that of the valve disc of a butterfly valve on account of the structural and manufacturing limitations involved, which result in more or less uneven flow of the tetrafluoroethylene or other synthetic resin powder used. For example, in the manufacture of the valve disc of a butterfly valve and particularly in the process of compression-molding the tetrafluoroethylene resin powder, the powder loaded in the mold tends to flow unevenly and be compacted to nonuniform density, particularly in its regions directly subjected to the molding pressure to form the opposite face regions of the valve member. Because of this, it has been usual that, in the heating stage following such compression molding, minute cracks are formed in the molded product or the latter is left in an unstable state liable to crack. To cope with this situation, it has been necessary to make a substantial allowance for removal of the cracked or unstable surface regions by an appropriate machining operation. This has not only caused loss of material but resulted in a substantial rise in the manufacturing cost on account of the machining and/or other finishing operation required. As an alternative measure to overcome the difficulties, an isostatic method of applying uniform pressure of liquid has been attempted. This method is effective to prevent occurrence of cracks or local embrittlements in the molded product resulting from any nonuniformity in density of the powder material, but it has not been fully put into practice with any success on account of its disadvantageous features, including extraordinarily large equipment cost, need for machining operation on the molded product, and the inability to obtain any satisfactorily high accuracy in the surface configuration of the product.

SUMMARY OF THE INVENTION

Under these circumstances, the present invention is designed to overcome the difficulties previously encountered as described above and more particularly to enable the synthetic resin powder, when pressure-molded, to be compacted to a definite density throughout, thereby to minimize formation of cracks in the molded product when subsequently heated, thus eliminating the need for any machining or other after-processing operation. This improves the productivity to a material extent with substantial savings in material and cost while ensuring highly stable and consistent product qualities.

Accordingly, the present invention has for its object the provision of a new and improved method of the character described for manufacturing a molded article of synthetic resin powder material.

Another object of the present invention is to provide a method for molding an article of synthetic resin powder material which exhibits improved characteristic features.

A further object of the present invention is to provide a method for molding an article of synthetic resin powder material which has its exterior surfaces of a highly compact structure as molded in direct contact with a pressure mold and left intact with no machining operation performed thereon and is particularly high in quality, including no bubbles, pinholes, cracks or other structural defects and suited to quantity production with an extraordinarily low rejection rate.

Yet another object of the present invention is to provide a method of manufacturing a molded article of synthetic resin powder material which is of the character described above.

These and other objects, features and advantages of the present invention will become apparent from the following description when taken in conjunction with the accompanying drawings, which illustrate a preferred embodiment of the present invention.

BRIEF DESCRIPTION OF THE DRAWINGS

In the drawings:

FIG. 6 is a partly cutaway perspective view showing a preforming mold assembly in its working state, which is comprised of a cylindrical-shaped side mold and the upper and lower mold halves of FIGS. 4 and 5 fitted therein and used in pressure-molding a load of synthetic resin powder material to form a valve disc segment;

FIG. 7 is a perspective view showing the component parts of a mold arranged for full-molding a pair of valve disc segments with a metal core interposed therebetween into an integral valve disc unit;

FIG. 8 is a view similar to FIG. 6, showing a compression mold assembly in its working state, which includes a cylindrical-shaped side mold and the mold of FIG. 7 fitted therein for pressure-molding the valve disc unit;

FIG. 9 is a cross-sectional view of a valve disc made as a specimen for comparison.

DESCRIPTION OF THE PREFERRED EMBODIMENT

Figure 2:
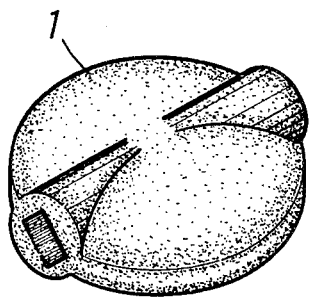
FIG. 2 is a perspective view of the valve disc shown in FIG. 1.
Figure 1:
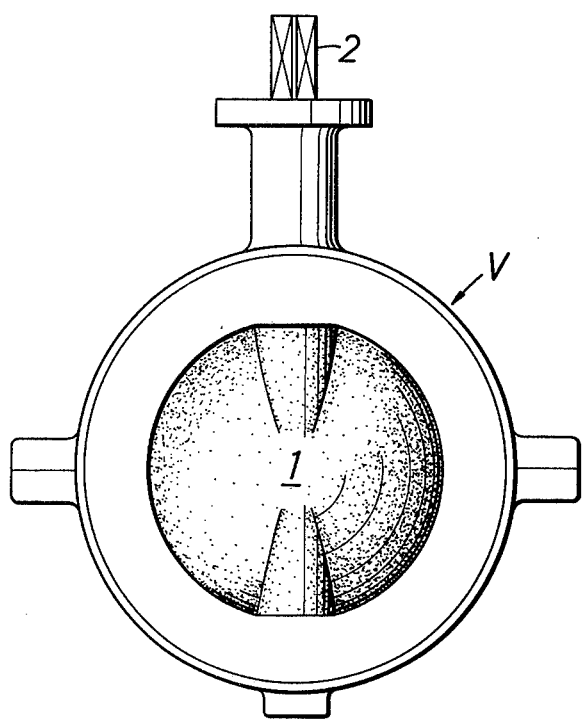
FIG. 1 is an end elevational view of the entire structure of a butterfly valve provided with a valve disc embodying the present invention.
Figure 3:
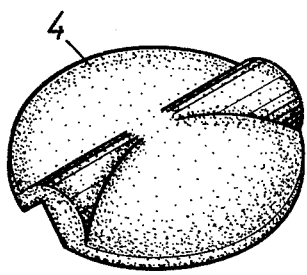
FIG. 3 is a perspective view showing one of two valve disc segments of the valve disc shown in FIGS. 1 and 2.

Illustrated in FIG. 1 is the entire structure of a butterfly valve unit V, which comprises a valve member or disc 1 fabricated by the method of the present invention. The valve disc 1 is mounted on a valve shaft 2 and is rotatable with the latter about the axis thereof (not shown) through any desired angle between open and closed end positions. FIG. 2 is a perspective view of the valve disc 1 per se.

As best shown in FIG. 7, the valve disc 1 is comprised of a circular disc-like core 3 having a pair of engaging portions 3' formed in positions diametrally opposite to each other for fitting engagement with the valve shaft 2 (FIG. 1) and a plurality (two in this embodiment) of valve disc segments 4 of tetrafluoroethylene resin arranged on the opposite faces of the circular core 3 together to form an integral cover layer thereon which extends over the whole surface of the core to impart an improved corrosion-resisting characteristic to the resulting valve disc unit.

Description will next be made of the method of the present invention as applied to the manufacture of the valve disc 1 with reference to FIGS. 3 to 8.

Figure 5:
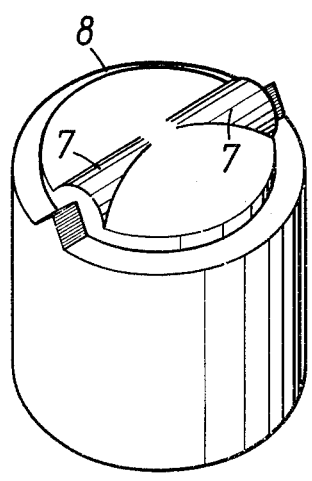
FIGS. 4 and 5 are perspective views respectively illustrating the upper and lower halves of a mold usable in manufacturing the valve disc segments of the valve disc.
Figure 4:
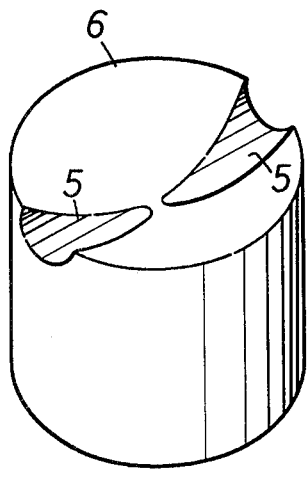

The process of manufacturing the valve disc 1 according to the present invention includes, among others, a preforming step in which a powder of highly corrosionresistant synthetic resin such as tetrafluoroethylene resin is pressure-molded into a valve disc segment 4 conforming to the exterior surface configuration of the core 3. A full-molding step in which two preforms of valve disc segment 4 having been formed in the preceding step are pressuremolded, with the core 3 interposed therebetween, under high pressure so as to be compacted to high density and bonded to the core integrally therewith, and a final heating step in which the valve disc segments which have been compacted and bonded integrally with the core 3 in the preceding, full-molding step are heated to make their bond to the core more secure. In the preforming step, as shown in FIGS. 4 to 6, a mold assembly is employed which includes a pair of upper and lower mold halves 8 and 6 and a hollow cylindrical side mold 9 in which the mold halves 8 and 6 are slidably fitted. The lower mold half 6 is formed in its top surface with a pair of semiconical grooves 5 in positions diametrally opposite to each other with their apex ends directed toward each other. On the other hand, the upper mold half 8 is formed on its bottom surface with a pair of protrusions 7 configured complementary to the semiconical grooves 5 in the lower mold half 6. An appropriate amount of tetrafluoroethylene resin powder is loaded in the mold assembly between the opposing surfaces of the upper and lower mold halves 8 and 6 and is pressure-molded under a relatively low pressure in the range of approximately 3 kg/cm$^2$ to 15 kg/cm$^2$ to form a preform of valve disc segment 4. Next, in the full-molding step, as shown in FIGS. 7 and 8, a mold assembly is employed which includes a hollow cylindrical mold 10 and a pair of identical upper and lower mold halves 11 and 12 slidably fitted therein. Two preforms of valve disc segments 4 formed in the preceding step are placed together with the core 3 interposed therebetween in the mold 10 between the opposing surfaces of the two mold halves 11 and 12 and full-molded under a high pressure in the range of approximately 100 kg/cm$^2$ to 300 kg/cm$^2$. In this manner, the preformed valve disc segments 4 are compression-molded to higher density and bonded integrally with the core 3. Subsequently, the integral assembly of molded disc segments 4 and core 3 is heated at a temperature of approximately 350° C. to 400° C. to complete an integral valve disc unit 1, which includes a highly corrosion-resistant layer structure of tetrafluoroethylene resin formed on the core 3 integrally therewith from the preformed valve disc segments 4 and covering the whole surface of the core 3.

In this connection, it is to be understood that the lower half 6 of the mold employed in the preforming step is substantially the same in construction as the upper and lower mold halves 11 and 12 used in the full-molding step and hence these three mold halves are interchangeable with each other, allowing substantial savings in mold cost.

According to the manufacturing method of the present invention, the cover layer structure on the disc core 3 with its portions 3' formed for fitting engagement with valve shaft 2 is formed of a plurality (two in the embodiment described) of valve disc segments 4, as previously described, and only a relatively small molding pressure is required to preform such valve disc segments 4 in the preliminary molding step, allowing use of a molding press mechanism of relatively simple construction and limited size. In addition, according to the method of the present invention, there is no need for machining or other after-processing operation conventionally required after the heating of finally molded products and this minimizes loss of material while at the same time giving marked rise in manufacturing efficiency and substantial reduction in manufacturing cost. Moreover, in contrast with the conventional manufacturing method, in which synthetic resin powder is applied to the core 3 in a manner so as to cover the whole surface thereof, and is then pressure-molded directly thereon and heated to complete a valve disc unit, the method of the present invention employs a pair of valve disc segments 4 preformed to a uniform density. These valve disc segments are further compressed uniformly under high pressure with the core 3 interposed therebetween so as to be gradually bonded to the core. This is advantageous in that the preformed valve disc segments 4 when fully molded under high pressure are progressively deformed to form on the core 3 an integral cover structure uniformly compacted throughout to a desired high density. Owing to this, in the following heating step, there is no occurrence in the cover structure of any cracks or other defects such as pinholes resulting from air bubbles and such cover structure is firmly set in solid contact with the core 3. It will be readily appreciated that the cover structure formed in this manner is highly uniform in composition as well as in density with a minimum of residual stress involved and it exhibits highly improved corrosion-resisting and durability characteristics.

In order to investigate the flow state of the load of tetrafluoroethylene resin powder material and particularly its surface regions in the course of the preforming of the valve disc segments 4 according to the method of the present invention, experiments were conducted with the resin powder material uniformly mixed with an appropriate amount of carbon filaments, glass fiber or the like fibrous material. As seen in the microphotograph of FIG. 10, the filaments admixed were turned sideways along the wall surface of the preforming mold, indicating a flow of resin powder material running uniformly therealong. Thus, the flow of resin powder material during the preforming period was uniform, particularly in regions in direct contact with the upper and lower mold halves 8 and 6, and the resulting structure was found particularly stable and sound with no variations in strength, exhibiting an evenly distributed orderly texture with no pinholes or other defects included.

Reference will next be had to FIG. 9, which illustrates, in transverse cross section, a valve disc 13 prepared for comparison with the one of the present invention. As shown, the valve disc 13 includes a core 14 and a cover layer 15 formed thereon. Unlike the cover layer of the valve disc 1 of the present invention, which is formed of a pair of two preformed disc segments 4, the cover layer 15 was formed in the following manner: First, the core 14 was placed in a mold assembly like the one shown in FIG. 7 between the upper and lower mold halves 11 and 12 and tetrafluoroethylene resin powder was loaded therebetween in an amount in excess and formed under pressure and heated. The resulting oversized product was machine-finished to size, as indicated in FIG. 9 by the double-dotted chain line 16. Reference numeral 17 indicates the thickness of the amount of material removed and this represents the molding allowance made to enable removal of any cracks or other defects possibly occurring in the surface of the cover layer 15. There was a random flow of resin powder material on the finished surface of the valve disc 13. It will be understood, therefore, that the finishing of the disc surface by machining not only results in loss of material and increase in labor cost but also in reduction in rigidity, density and other characteristic qualities of the product.

Though, in the embodiment described, tetrafluoroethylene resin powder has been used as a synthetic resin powder material for the valve disc, it will be apparent to those skilled in the art that any other type of synthetic resin powder may be employed with success as long as it exhibits a satisfactory corrosion-resisting property.

What is claimed is:
1. A method of manufacturing an article consisting of a core fully covered with a layer of corrosion-resistant synthetic resin material molded and bonded to the entire surface of the core, comprising:
   (a) placing corrosion-resistant synthetic resin powder in a first mold consisting of two half members having a cavity corresponding to that of a desired preform,
   (b) compressing the resin powder in the first mold to the desired shape to bond the particles of powder into a unitary first preform segment,
   (c) removing the first preform segment from the first mold,
   (d) repeating steps (a), (b) and (c) to form a second preform segment,
   (e) placing the first and second preform segments over the opposite surfaces of the core to enclose the core as an assembly,
   (f) placing the assembly in a second mold having movable halves,
   (g) compressing the preform segments in the second mold at a pressure greater than that in the first mold to bond the first and second preform segments to the core and to one another, and
   (h) heating the assembly to a temperature to complete the bonding and to form the preform segments into a covering layer of said resin over the entire surface of the core as the manufactured article.

2. The method of claim 1 wherein one of the half members of the first mold is identical to both halves of the second mold.

3. The method of claim 1 in which the synthetic resin powder is tetrafluoroethylene.

4. The method of claim 3 where in step (b) the pressure is about 3–15 kg/cm$^2$; in step (g) the pressure is about 100–300 kg/cm$^2$ and in step (h) the temperature is about 350°–400° C.

* * * * *